Aug. 12, 1941.  G. GORTON, 3D  2,252,627
MACHINE TOOL OF THE SENSITIVE TABLE TYPE
Filed March 15, 1939   4 Sheets-Sheet 3

Inventor
George Gorton III
By Peck & Peck
Attorneys

Aug. 12, 1941.  G. GORTON, 3D  2,252,627
MACHINE TOOL OF THE SENSITIVE TABLE TYPE
Filed March 15, 1939  4 Sheets-Sheet 4

Inventor
George Gorton III
By Peale & Peale
Attorneys

Patented Aug. 12, 1941

2,252,627

UNITED STATES PATENT OFFICE 2,252,627

MACHINE TOOL OF THE SENSITIVE TABLE TYPE

George Gorton, III, Racine, Wis., assignor, by mesne assignments, to George Gorton Machine Co., Racine, Wis., a corporation of Wisconsin Application March 15, 1939, Serial No. 262,038

18 Claims. (Cl. 90—19)

This invention concerns certain improvements in and relating to machine tools of the sensitive table type; and the objects and nature of the invention will be apparent to those skilled in the art, in the light of the following explanations of the disclosures made by the accompanying drawings which illustrate a mechanical expression or embodiment of the invention taken as an example from among other forms, combinations, and modifications within the spirit and scope of the instant invention.

It has heretofore been proposed to cut and enlarge round holes in various machine parts, by a single-purpose organization employing a longitudinally-elongated horizontal work table at one end mounted to swing laterally on a vertical pivot carried by a longitudinal slide, and at its free end receiving the propelling vertical crank pin of a vertical rotary crankshaft fixedly located under said table end necessarily in accurate axial alinement with the fixedly located rotary cutter spindle above the free end of the table on which the work is located between said cutter spindle and said crankshaft. In this proposed organization, the longitudinal axial lines of the cutter spindle, the crankshaft and said vertical pivot are necessarily located in a common vertical plane that also includes the longitudinal axis of said work table, and consequently the work must always be centered and fixed on the free end of the work table, with the common axial line of the cutter spindle and crankshaft passing through the center of the area of the work to be operated on. If any other off-center or differently located areas of the work clamped on the work table are to be operated on, the operator, for each change in area to be cut, must go through the time consuming process of releasing the work and shifting and accurately positioning the same and again clamping the work to the table with the new area to be cut centered with respect to the axially alined spindle and crankshaft.

I have discovered that the above difficulties are avoided and new results and important advantages are gained, in the production of arcuate and circular cuts of predetermined radii and straight line cuts of predetermined locations and lengths, in a horizontal plane or planes, in the work, by combining a work-table-propelling-and-controlling rotary eccentric member of a settable predetermined radius, with and operatively coupling the same to any suitably-located part rigid with the universally laterally bodily movable horizontal work table of a general purpose machine tool, say of the milling, die-sinking, duplicating, or other types, having a vertical cutter spindle cooperatively-arranged to operate on the work fixed to any suitable area of said table, under lateral table movements that carry the work laterally into lateral cutting association with the cutter of said spindle, when said table has been released from its normal feeding and controlling means, for free universal lateral straight and arcuate movements in all directions under the propulsion and control of said rotary eccentric member. This machine tool work table is thus described as bodily movable laterally in all directions on straight line and arcuate paths of movements, because all portions of the table move the same distances and in the same directions and maintain their same relative positions and locations, during such movements, i. e., during all of such table movements the vertical plane that includes the longitudinal axis of the work table always remains parallel with the vertical plane, longitudinally of the table, that includes the longitudinal axis of the cutter spindle, and during all of said table movements the vertical plane, transversely of the work table, that includes the axial line of the cutter axis, always remains perpendicular to said longitudinal vertical planes and to the front and rear longitudinal edges of said work table.

I thus found that the rotary vertical eccentric member of the table propelling and controlling radius means, could be operatively coupled to any portion operatively rigid with said universally laterally bodily movable horizontal work table, such as, for example, a laterally projecting arm temporarily otherwise fixed thereto, with the vertical axis, such as a propelling crankshaft of said eccentric member located at any desired distance radially remote from the cutter spindle axis, even at an easily accessible position located outwardly beyond said table. It also was developed that variously located and arranged portions of the work clamped on said table and properly located and centered with respect to the cutter spindle, could, by operation of said table propelling means and radial adjustment of said eccentric means, be brought into operative cutting relation to the cutter of said spindle, without changing the position of the work on the table. These results were rendered possible and were developed, because under the propulsion of said eccentric member, the work table bodily and as an entirety and throughout its full area uniformly duplicates the movements of said member. If the eccentric member is rotated through 360°, or any fraction thereof, on a certain radius, all portions of said table follow the same arcuate path of the same radius, and the same is true of straight line table propelling movements of the eccentric member, of any length or at any angle, within the capacity of the eccentric member and its crank.

An object of the invention is to provide a machine tool that includes a vertical cutter spindle in cooperative relation to such a universally laterally bodily movable work table, with table actuating and control mechanism, fixedly supported, or adapted to be fixedly supported, with respect to said table, including a table propelling member rotatable on a vertical axis remote from said cutter spindle, and having, or adapted to have, eccentric positive push and pull vertical pivotal connection with any suitable part of or part rigid with said table, said mechanism being settable and operable to predetermine the lateral straight-line, arcuate, or circular paths of bodily movement of said table under the propulsion of said member.

A further object of the invention, is to provide an improved attachable and detachable accessory for such a universally laterally bodily movable work table of a machine tool where a vertical cutter spindle normally held against lateral movement is arranged over and in operative relation to any top work-receiving area of such horizontal table; and to provide such accessory with a supporting frame for fixing in a position substantially exteriorly of such work table, to a normally stationary part of the machine tool, and to provide such frame with a rotary vertical member, having actuating means, and located laterally remote from said vertical cutter spindle when said frame is fixed in operative position to said machine tool, and to provide an applicable and detachable lateral push and pull operative connection between said rotary member and any suitable part of or part rigid with said table including a vertical pivotal axis eccentric with respect to said rotary member, and to provide accessible and easily operated means for adjusting said lateral eccentric connection and accurately setting the same for predetermining the radius of circular, and the radius and length of arcuate, and the length and angle of straight line paths of movement of said table.

And a further object of the invention is to provide a machine tool having a vertical cutter spindle normally fixed against lateral shifting and located over a suitable top work receiving area of a freely universally laterally movable work table, with improved table propelling and controlling mechanism for actuating said table on predetermined defined arcuate, circular or straight line paths of movement while maintaining the operative lateral cutting relationship between the work and cutter, whether such mechanism be included in the machine or constitute an accessory for application to and operative disconnection from the machine, to provide such mechanism with adjusting, actuating, setting means and cooperative scale means for the quick, easy and accurate adjusting and setting of parts for the accurate predetermining of the cuts to be produced in the work.

With the foregoing and other objects in view, developed by the following explanations, the instant invention consists in certain novel structures, features, organizations, combinations and sub-combinations more fully explained hereinafter, and specified by the appended claims.

Referring to the accompanying drawings, forming a part hereof:

Fig. 2a shows the universally laterally movable table in cross section in a transverse vertical plane that approximately includes the vertical axial line of the rotary cutter and its spindle, approximately the same plane of the vertical section of Fig. 2, Fig. 2a should be read in connection with Fig. 2 as the supporting arm and the arm rigid with the table are also shown in part by Fig. 2a.

Fig. 5 is a detailed end view of the crank and a portion of the housing carrying the vertical axis on which the crank swings.

As an example of one machine tool, among others, to which the instant invention can be applied or with which it can be operatively associated, I happen to illustrate in part, the type of vertical milling machine, or a so-called duplicating machine tool, disclosed by U. S. Letters Patent No. 2,005,696, issued June 18, 1935, to George Gorton Machine Co., Racine, Wisconsin, as assignee. Said patent is referred to for a complete disclosure, if required, of adjustments and features, not disclosed by the instant case, without intending to thereby limit the instant invention to the milling or other machine tool type of said patent.

The machine tool illustrated by the accompanying drawings provides a horizontally disposed and movable holder for the work $w$, in the form of work table 1, arranged below the elevated vertical cutter head 2, of the machine tool, normally fixed against lateral and vertical movements. This cutter head carries a vertical rotary driven cutter spindle 3, at its lower end having a collet or chuck for replaceably receiving, holding and driving a milling or other cutter 4. This cutter spindle is mounted in and carried by a vertical quill or slide barrel 5, longitudinally movable in the cutter head and normally held thereby against operative lateral movements. The cutter spindle is rotated by any suitable belt or other drive from a suitable motor, and is usually provided with any suitable feed means for raising and lowering the same and with any suitable depth stop mechanism, such as is common in the art, or such as disclosed by said patent.

In the drawings, the tracer head 6, and its vertical tracer spindle, of the duplicating machine of said patent, appear, but where the instant invention is employed the tracer spindle and tracer do not function.

In the example disclosed, the work table 1, is provided with mountings that render said table universally laterally movable in a normally fixed horizontal plane perpendicular to the vertical axial line of the rotary cutter spindle 3, meaning that said horizontal table on all lateral arcuate, circular and straight line movements maintains its longitudinal axial line constantly parallel with a vertical plane longitudinally of the table and including the longitudinal axial line of the vertical cutter spindle, and that all portions of the table move in like directions and like distances and maintain the same relative positions throughout said table lateral movements. In this particular example, without intending to so limit the instant invention, this mounting includes a base 7, that can be rigidly and removably clamped to the ordinary longitudinally and transversely feedable work table 1a, carried by an ordinary milling or other machine tool vertically adjustable knee.

A saddle 8, is carried by and mounted on said base 7, and is confined thereto against relative vertical and lateral longitudinal movements, but is free for straight line transverse lateral movements with respect to the base, as by parallel rows of traveling balls 9, confined between opposing V-grooves. The instant work table 1, is carried by said saddle and is confined thereto against relative vertical and transverse lateral movements, but is free for straight line longitudinal lateral movements on said saddle, as by parallel rows of traveling balls 9a, confined between opposing parallel V-grooves.

The table 1, is thus rendered exceedingly sensitive and quickly responsive to laterally propelling forces tending to move the same in any lateral direction, either in straight lines in any directions or to move laterally in arcuate or completely circular paths, as the result of lateral longitudinal movements of the table on the saddle and of lateral transverse movements of the saddle that transports the table transversely. However, it is not my intention to limit the instant invention to any particular table mounting or to a table mounting that includes balls or rolling supporting devices, and the work "sensitive" is not employed herein in any such restricted meaning, as the work table can be otherwise mounted, to permit such bodily universal lateral straight line and arcuate movements, within the spirit and scope of this invention, under which all portions of the horizontal table move uniformly and alike, as hereinbefore explained.

In the particular example illustrated without intending to so limit the instant invention, the limits of transverse and longitudinal free movements of the table are defined by the depending vertical annular abutment wall 10, of the table 1, surrounding the upstanding stop stud 11, rigid with the base 7.

The instant drawings do not disclose the hand leverage shown in said patent for propelling and controlling the lateral movements of the table thereof to which both the work and the pattern to be duplicated are secured, to maintain the operative lateral association of the cutter and work and of the tracer and pattern, when the machine tool of the patent is employed for duplicating the pattern in the work, as said leverage as well as the tracer, are not employed, where the instant invention is operatively included in the particular machine tool example shown.

In the example illustrated, the work table is bodily universally laterally movable in a normally fixed plane, and during all lateral movements of said table, whether circular throughout 360°, or any fractions thereof, or angular or straight line, the vertical planes that include the longitudinal axis of the table at all positions of the table during such movements, are all parallel.

The instant invention cooperatively associates with said table, a propelling and controlling mechanism that actuates the table on any predetermined universal arcuate or straight-line or other lateral movements, and accurately confines, guides and limits such table movements to those predetermined by the desired adjustment and setting of said mechanism, to produce in the work the predetermined horizontally extending cuts desired. The rotary cutter spindle and the vertical cutter carried thereby are fixedly located against lateral movements with respect to the table during a cutting operation, and the work w, rigidly clamped or otherwise normally fixed to the work table, is operatively maintained by the lateral movements of the table in lateral cutting association with the cutter to accurately produce in the work the exact cuts extending in a horizontal plane, predetermined by the adjustment and setting of said mechanism. The primary object is to produce horizontally extending arcuate cuts of any predetermined radius and length within the capacity of the particular installation.

The propelling and controlling mechanism provides a horizontally movable member rotatable on a vertical axis that is laterally remote from said vertical cutter spindle and the work-receiving area of the table, and is normally fixedly located with respect to said laterally movable table, and said member has table push and pull operative connection with a part rigid with said table, and this operative connection between said member and said part is eccentric with respect to said axis, and the radius of said eccentricity accurately determines the radius of the horizontally extending cut produced when the table is actuated by said mechanism to hold the work to and move the same around and against the rotating cutter. Means is provided to rotate said member horizontally on said vertical axis to propel the table. Means are also provided whereby said eccentricity can be adjusted and set to any radius within the capacity of the mechanism and the laterally movable work table.

For instance, a supporting frame, such as 12, is provided normally rigidly supported independently of and fixed with respect to table 1, wherever located with respect to said table, and a vertical rotary table propelling member, for instance, shaft 13, is mounted in said frame 12, and normally fixedly located against lateral movement, and this shaft 13, is provided with actuating means for rotating the same in either direction through a complete revolution or any fraction thereof. This shaft is operatively coupled to said movable table through the medium of a table controlling and propelling connection that includes eccentric means rotatable with said shaft in a horizontal plane. For instance, this eccentric means, in the example shown, comprises a radial or horizontal crank arm 14, normally rigid with said vertical shaft, and provided with a vertical crank pin, such as, 15, normally rigid therewith. This crank pin 15, in the example shown, is rotatably mounted, against objectionable lateral play or lost motion, in a rigid part that is fixed to and accurately movable laterally with the work table 1. For instance, in this example, the crank pin 15, is rotatably mounted in the vertical bearing hub 16a, rigid with and a part of the strong stiff arm 16, normally rigid with said work table 1, and that in effect forms a rigid part of said table wherever located with respect thereto.

Where the table propelling and controlling organization of my invention is built into a vertical milling or substantially like machine tool as a more or less permanent part thereof, with said machine having a universally laterally movable work table below the vertical cutter spindle normally fixed against lateral movements, the functions and operations of said mechanism and its cooperative association, with the table will be as hereinbefore broadly described, regardless of the relative locations of said table and said organization.

In the embodiment disclosed as an example, the table propelling and controlling mechanism, is in the form of an accessory or attachment applicable to and removable from a machine tool having a universally laterally movable work table or a work table, when freed from feeding mechanisms, capable of such universal lateral movements, with a vertical cutter spindle, arranged above said table and capable of being fixed against lateral movements. The drawings disclose the table propelling and controlling mechanism associated with a duplicator type of machine tool, without desiring to so limit the invention, but this disclosed type of machine tool, is nevertheless a vertical milling or like machine, having the required work table movements and the required vertical cutter spindle.

In this particular application and example, the supporting frame 12, of the table propelling mechanism, provides a strong rigid lateral supporting arm at its free end provided with a vertical base 12a, adapted to abut and be rigidly and removably secured to some part of the milling machine that is fixed with respect to the work table 1. For instance, this base 12a, as disclosed, is formed with a horizontal bolt hole, for the reception of a removable headed bolt 12h, that rigidly clamps said base 12a, to the front edge of the stationary base 7, of the work table mounting, against normal relative looseness or movement.

In this specific example, the part rigid with the work table, in which the eccentric member or crank pin 15, is rotatably mounted, happens to be in the form of stiff rigid pitman or arm 16, at its free end having rigid vertical base 16b, perforated for the passage of removable bolt 16c, for clamping said base 16b, against the front edge of work table 1, against relative movements or looseness.

Obviously, the part 16, can, if desired, be a more or less permanent part of the table, and the table propelling mechanism can be applied thereto and removable therefrom, by moving the supporting frame 16, upwardly, when released from bolt 12h, to longitudinally slip the crank pin 15, into bearing hub 16a, or downwardly to slip said pin from the hub.

On the other hand, under certain conditions or with certain machine tool types, the supporting frame 12, and the remaining mechanism carried thereby, might remain as a more or less permanent part of the machine tool fixed to a stationary part thereof, as by bolt 12h, or otherwise, with the arm member 16, removable from and applicable to the crank pin 15, and the table 1, as hereinbefore described.

In the example shown, the projecting upper end of the crank pin is longitudinally threaded to removably and adjustably receive a clamping nut 15a, that clamps bushing 15b, on pin 15, against the base of the pin, and said bushing with pin 15, is rotatable in the bearing hub 16a, of arm 16. The crank pin surrounded by said bushing can be, as before described, slipped longitudinally from or into said bearing hub 16a.

Where the table propelling and controlling organization, is in the form of an accessory or attachment, and is operatively applied to the machine tool, in the manner just described, the arrangement is preferably but not necessarily, such that the vertical axes of the cutter spindle and of the vertical rotary shaft 13, are substantially located in a common vertical plane that is substantially perpendicular to the longitudinal axis of the work table 1.

In this particular example, the mechanism supporting frame 12, includes as a rigid part thereof, a vertical gear box or housing 12b, substantially closed at the top by a transverse rigid head or wall 12c. This housing provides an internal substantially-central rigid vertical bearing hub 12d, opening through and depending from top head 12c, for the vertical rotary shaft or member 13. This shaft can be mounted in said hub, as through the medium of upper and lower sets of radial and end thrust ball or other bearings 13a.

Any suitable means, power actuated under manual control, or manually actuated, can be provided for rotating shaft 13, for propelling the table 1, although in the instant example, I happen to show, an exterior accessible actuating handle or wheel 17, normally rigid with and actuating and carried by horizontal shaft 18, mounted in and extending into the housing 12b, and geared to the vertical shaft 13, to rotate the same in either direction. Suitable gearing can be provided for this purpose, although I happen to show worm 19, normally fixed on shaft 18, and operatively in mesh with worm or spiral gear 20, normally fixed on the vertical shaft 13.

The crank arm 14, rigid with vertical shaft 13, is shown, above the top wall 12c, of the frame housing 12b, and of rigid massive formation, in one piece with the vertical shaft 13, which also is shown of heavy strong formation. The crank 14, in this example, is of longitudinally-elongated formation extending laterally from the upper end of shaft 13, and substantially rectangular in end elevation with parallel vertical longitudinal side faces 14a. This crank 14, provides a longitudinal internal slideway 14b, extending substantially throughout its length, longitudinally open at the upper face of the crank, to receive the laterally enlarged head or base 15c, of and rigid with the crank pin 15. This base 15c, fits snugly in and is, for adjustment purposes, slidable longitudinally in said slideway. This base, preferably, fits in the slideway against relative vertical movement. For instance, the slideway can be of inverted T formation in end view, and the form of the base is complementary thereto, or otherwise to confine the base to the crank arm, for the desired adjustment with respect thereto.

If so desired, a plate 21, can be fixed on said base 15c, overlying the top longitudinal faces of the crank, with at least one vertical edge face of said plate visibly exposed above the vertical side face 14a, of crank 14, provided with the exposed visible scale s, composed of progressively increasing linear unit indications. The said vertical edge face, of plate 21, preferably bears a visible index mark i, appropriately located opposite the longitudinal axis of crank pin 15, for reading with the marks of scale s, to determine the radial distance of the crank pin 15, at any point to which adjusted, from the longitudinal axis of shaft 13, to predetermine the radius of horizontally extending cuts to be made in the work.

Any suitable means can be provided for sliding the crank pin 15, longitudinally of the crank 14, and setting the same at any desired radial distance from the axis of shaft 13, as indicated by the index i, movable along scale s. For instance, for this purpose I show longitudinal rotary adjusting screw 22, arranged in the crank guideway 14b, and meshing with and extending through a screw threaded hole 15e, in the nonrotary base 15c, of crank pin 15, whereby rotation of the screw in the proper direction will move the base 15c, and said pin along the crank to attain the desired eccentricity, and the screw threaded connection between screw and base, will automatically lock the crank in the position to which adjusted.

The shaft of the adjusting screw 22, is rotatably mounted in and extends through and is held against substantial longitudinal movements by a fixed end wall 14d, of the crank 14.

The outer end of the shaft of screw 22, is provided with exposed and accessible means for rotating the screw in either direction. For instance, screw-actuating hand or thumb wheel 22a, rigid with the screw, is shown. This hand wheel and an adjacent part of the wall 14d, can be provided with a visible micrometer scale and index.

Means are provided for temporarily holding and locking the crank arm 14, in any predetermined angular position, and against lateral movements, as when straight line cuts are to be made in the work, by manipulation of the wheel 22a, and screw 22. Such means can also be utilized for predetermining the lengths of arcuate or angular movements of crank, where such movements are through less than 360°.

For instance, the top wall 12c, can be formed with an endless circular inverted T or other guideway 24, open at the top and concentric with the rotary shaft 13. At least some portion of this slot is open at the bottom, for insertion and removal of headed or T bolts or studs 25. These bolts when in the slot present comparatively short screwed portions projecting upwardly above the top level of the wall 12c, and below the horizontal circular or arcuate path in which the crank 14. is movable. These bolts. when released, are freely and independently slidable in and throughout the full circle of the slot. The drawings happen to show two independent bolts 25, in said slot. Each such bolt. is equipped with a removable and applicable screw threaded complementary nut 26, adapted to screw down thereon into tight bolt-locking engagement with the adjacent top face of wall 12c. Each such nut 26 is elongated vertically to extend a sufficient distance upwardly into the circular path of arcuate movement of crank 14, to constitute a stop dog or abutment. Thus, when two stop dogs 26, are locked to the wall 12c, spaced the predetermined or required number of degrees apart, with the crank 14, movable laterally between such dogs, the limits of the crank movements are established, by stopping contact between the opposite vertical side faces of the crank, and the adjacent dogs, respectively. These dogs can be shifted completely around the full circle of the slot 24, and locked at any desired portions thereof, according to the particular portion of the work in which the arcuate cut is to be made. Also, where a straight line cut is to be made, the two dogs can be arranged in close contact with the opposite side faces of the crank, and locked in position, to hold the crank against lateral movements.

Where not required, the dogs 26, can be removed from their complementary bolts 25, as when the crank is required to move throughout a full circle, to produce a circular cut in the work.

The upper end of the gear case portion 12b, of the supporting frame 6, is, in this example, exteriorly formed with a surrounding circular supporting and bearing seat 12e, concentric with rotary shaft 13, for the reception of rotary ring dial 27, also concentric with said shaft, and arranged for rotatory adjustment on said seat around the axis of said shaft as a center. The preferably flat top surface of said dial is preferably flush with the adjacent top surface of the top wall 12c. This dial is normally clamped against movement, as by the rotatable clamping and releasing thumb screw 27a.

The top surface of this dial is provided with a visible scale x, preferably extending completely around the circle thereof and here shown as made up of uniformly spaced degree marks or indications. This annular scale, is at diametrically opposite points, preferably provided with visible zero marks or indications, and at two opposite points on a diameter at right angles to said first named diameter, is preferably provided with 90 degrees indications or marks. The annular scale is thus divided into quarters, with each quarter, preferably, provided with visible degree graduations or indications such as 10, 20, 30, in arithmetical progression from zero to 90.

The annular portion of the top face of wall 12c, that is substantially flush with the top face of the dial 27, is preferably provided with fixed index marks z, at the ends of the diametrical line that is perpendicular to the longitudinal axis of said table 1, for reading in association the graduations of the dial scale. Thus, the rotatable dial is usually normally fixedly located with its two diametrically opposite zero indications in registration with said fixed index mark z, respectively.

If so desired, the top face of the housing wall 12c, can also be provided with fixed index marks y, for reading in association with the graduations of the dial scale, with these fixed marks at the ends of the diametrical line of said dial, that is parallel with the longitudinal axis of the table 1. Thus, with the dial in its above suggested normal position having its diametrically opposite zero graduations in registration with the fixed index marks z, the two diametrically opposite dial graduations 90°, will be in registration with the fixed index marks y, if employed.

The crank 14, is provided with any suitable index, such as depending index pointer 28, travelling in close visual association with said annular scale x, on the top face of dial 27, for reading in connection with said dial scale, to indicate and show, the angular position of the crank with respect to the dial and consequently with respect to the work and the cutter spindle, and with respect to either the longitudinal or the transverse axis of the work table.

In this example, the pointer 28, is located in a vertical plane that is common to the axial lines of rotary shaft 13, crank pin 15, and screw shaft 22, and is fixed to the free end of crank 14.

The four quarters into which the dial scale is divided, in the example shown, when said dial is in said normal fixed position, represent the four quarters of the circular area of table 1, having a radius equal to the maximum radius of crank pin 15, and centered around the cutter 4, particularly where the vertical plane of the transverse axis of the table 1, also includes the axes of cutter 4, shaft 13, and the crank pin 15, when the crank 14, is in position with its longitudinal axis included in said vertical plane.

Thus, by cooperation between the crank index 28, and said graduations of the dial scale, the crank 14, by rotation of shaft 13, can be swung to any predetermined angular position, as indicated by said dial scale, with respect to any one of said imaginary quarters of said circular space of which cutter 4, is the center, for operation on work secured to the table and located in such quarter. Also, such arrangement permits swing of the crank to any position, indicated by the index 28, on the dial, at any predetermined angle with respect to said longitudinal axis of the table 1, or at any predetermined angle with respect to said transverse axis of said table, or to a position wherein said index and dial scale show that the longitudinal axis of the crank is parallel with the longitudinal axis of table 1, or to the position wherein said index and dial scale show that the longitudinal axis of the crank is perpendicular to said longitudinal axis of the table.

Where a circular cut of 360°, of a certain radius, is to be made in the work, the stop dogs 26, are removed, and the shaft 13, is rotated to bring the index 28, of crank 14, into registration with one of the zero marks of the dial scale, the dial being then located in its normal fixed position. The hand or thumb wheel 22a, is then rotated to adjust the crank 15, longitudinally of the crank until the crank pin index i, registers with the graduation of scale s, that indicates the required radius of the cut to be made. The work is then properly located on the table 1, with respect to the cutter 4, for initiation of the circular cutting operation, and after the completion of any preliminary cutting, if necessary, by manipulation of hand wheel 17, the crank is started on its stroke, to carry the table 1, and the work in the required direction, around the cutter 4, to initiate and complete the cutting of the circular cut of the predetermined ratio. The crank can propel the work in one direction throughout the full 360°, or through 180° in one direction and through the remaining 180° in the opposite direction. If the width of the circular cut required, is greater than the diameter of the cutter employed, necessitating repeated concentric circular cuts of progressively differing diameters, the crank will be brought to rest at zero, after completion of each 360° cut, and the crank pin will be adjusted and set at the changed radius for the next 360° cut.

If the job requires a straight slot or groove in the work, the longitudinal axis of which is parallel with the longitudinal axis of the table 1, the shaft 13, is rotated to bring the crank arm 14, to a position with its index 28, registering with one of the 90°, graduations of the dial scale while the dial is in said normally fixed position. This brings the crank to the position where its longitudinal axis is parallel with the longitudinal axis of the table 1. The thumb wheel 22a, is then rotated to move the crank pin 15, to its zero position, i. e. with its axis alined with the axis of shaft 13. The work piece is then brought to proper position with respect to cutter 4, for initiating such straight cut, and fixed to table 1.

The crank is also fixed in such 90° position by clamping the same between a pair of stop dogs 26, fitting the opposite side faces of the crank. Thereupon, the cutting work can proceed, by rotating the thumb wheel 22a, which causes straight line propulsion of the table and consequently the work past the cutter.

Where the width of the straight slot or groove, requires repeated strokes of the work past the cutter, the necessary lateral feeding of the work, is taken care of by the ordinary lateral feeding means of the ordinary work table on the machine tool knee.

The crank is located with its index 28, registering with a zero dial indication and there clamped, the dial being in its said normally fixed position, when a straight slot, groove, or cut is required, that is perpendicular to said longitudinal axis of the work, and the same procedure is then followed, as where a cut parallel with the table longitudinal axis is to be made.

Straight line cuts at any other angle to the longitudinal axis of the table, or to the transverse axis of the table, can be made by substantially following the foregoing procedure, as the required angles can be located by the crank index in cooperation with the dial scale.

For instance, if the required angle of the straight cut to be made, equals 40°, with respect to the transverse axis of the table 1, i. e. 40° with respect to the diametrical line z—z, the dial can be released, and rotated in the required direction, to carry its zero mark through 40°, from the complementary index z, i. e., until the 40°, of the next quarter of the dial scale registers with said index z. The dial can then be temporarily clamped in such adjusted position. The shaft 13, will then be rotated to bring the crank index into registration with said dial zero graduation. The crank can then be temporarily fixed at said 40° angle. The work positioning and cutting operation can then be proceeded with.

It will be noted, that the crank can be thus accurately located at the required angle, by cooperation of the dial, its scale, and the crank index, without mental effort on the part of the operator, in adding or subtracting, scale graduations, etc.

The same method can be followed in locating the angular positions of the crank, where arcuate grooves, slots or other cuts less than 360°, are to be angularly positioned as to length, with respect to the longitudinal axis of the table 1, for instance.

Figure 1:
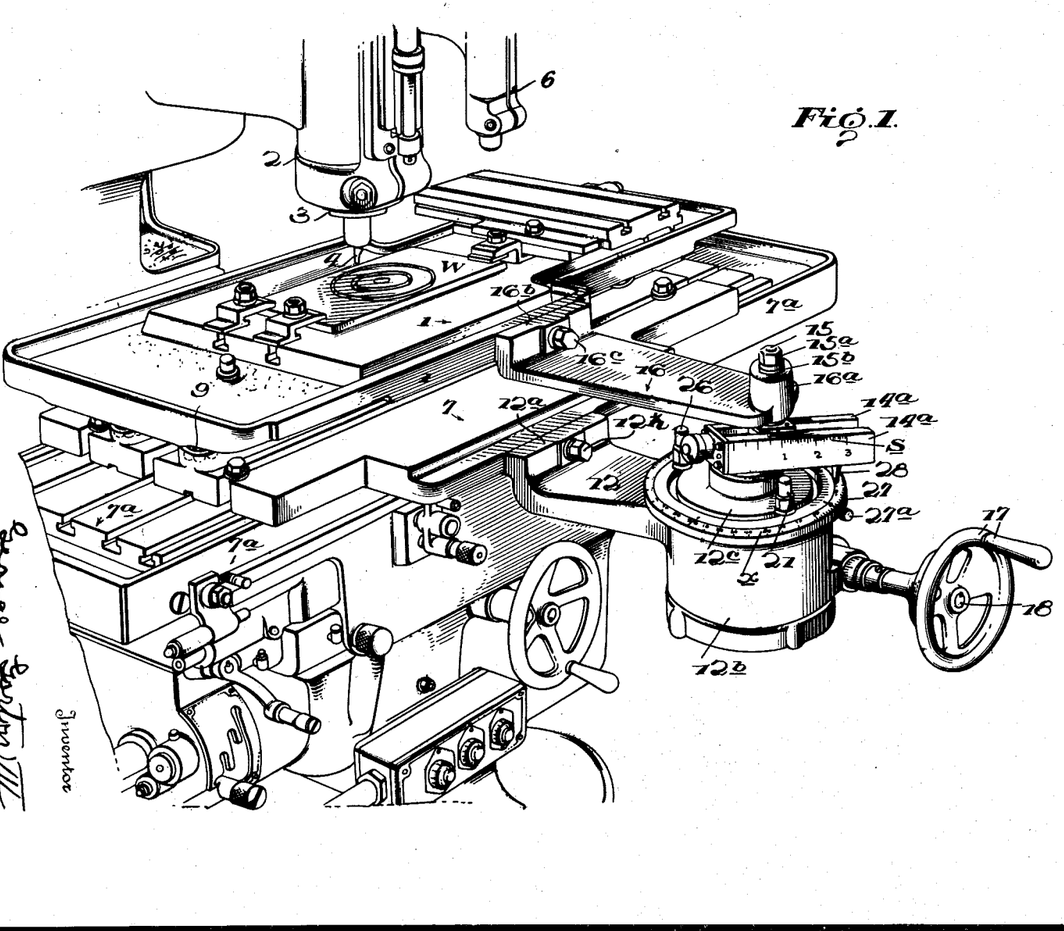
Fig. 1 shows in perspective a machine tool in part, of the type having a universally laterally movable work table and a vertical cutter spindle normally held against lateral movement, provided with and including an embodiment of the instant invention, the machine tool shown happens to be a vertical milling machine type having a duplicating attachment applied thereto and mounted on the ordinary milling machine work table carried by a knee and provided with transverse and longitudinal feeding mechanisms.
Figures 2, 3:
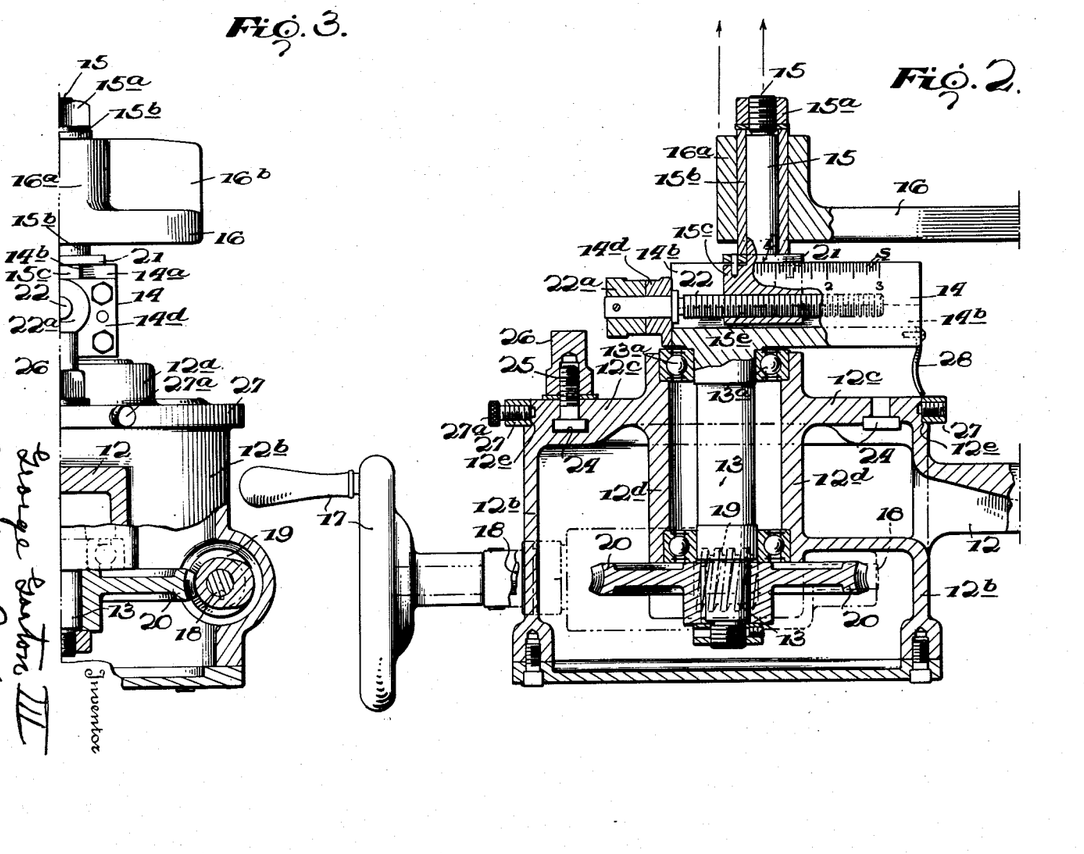
Fig. 2 shows an embodiment of the instant invention in central vertical section with parts broken away and other parts disclosed by dotted lines, the lateral supporting arm of the attachment of this invention being partially shown, and the arm rigid with the universally laterally movable table being also partially shown.
Fig. 3 is a partial sectional front elevation of the organization disclosed by Fig. 2.
Figures 2A, 5:
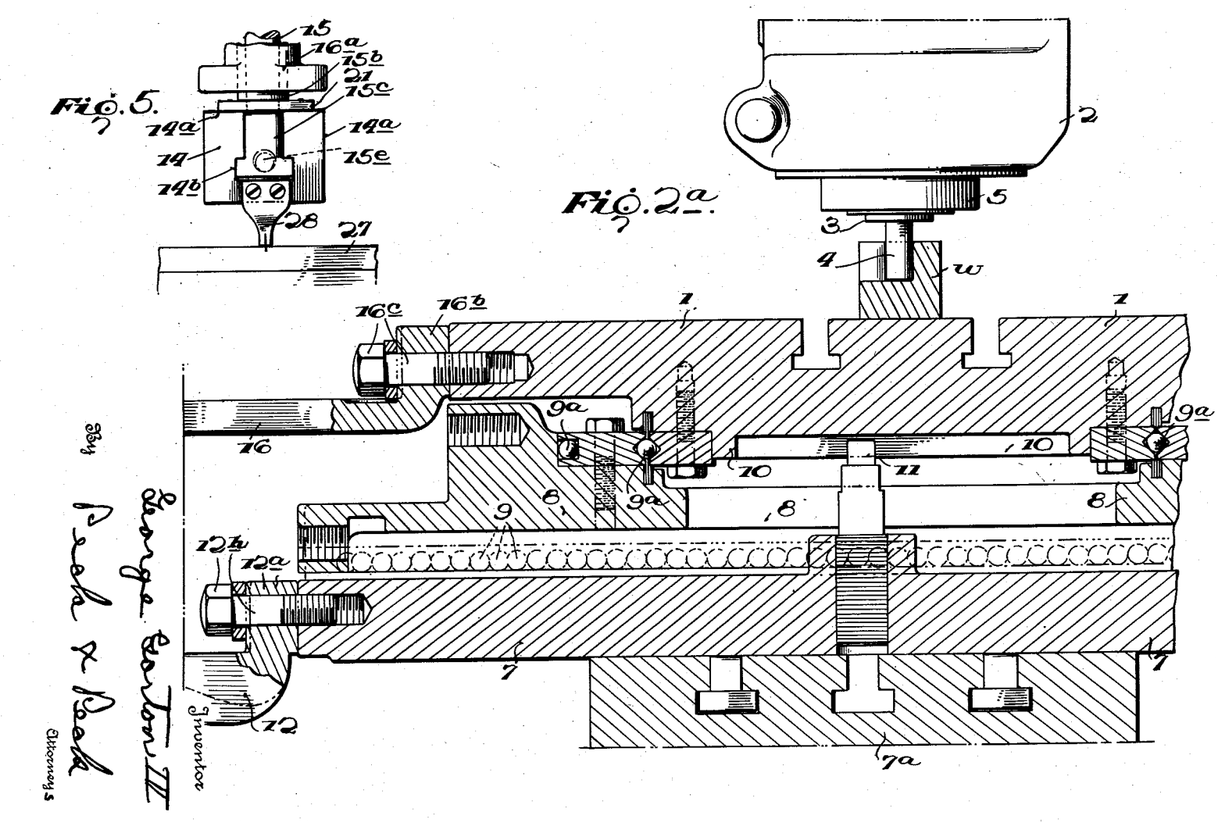
Figures 4, 6, 7, 8:
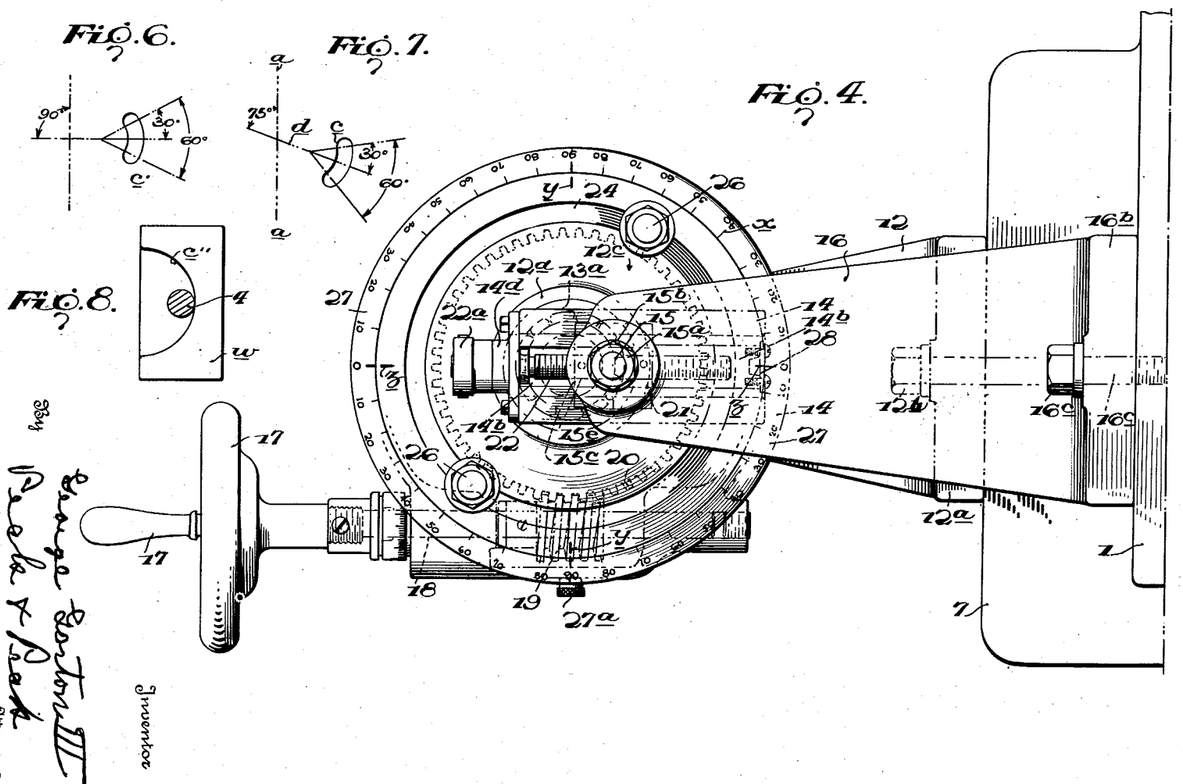
Fig. 4 is a top plan view of the universally laterally movable table and its mountings, in part, and of the organization disclosed by Fig. 2, certain otherwise hidden parts being shown by dotted lines.
Figs. 6, 7 and 8 are diagrammatical plan views, the cutter being shown in section in Fig. 8, of various types of cuts in the work.

As an example, in Fig. 7, the arcuate slot c, is to be cut in the work, and this slot is to be angularly positioned in the work with respect to the line a—a, parallel with the longitudinal axis of the work or laterally movable table 1. This slot extends through approximate 60°. The center line d, bisecting this slot c, is at an angle of, say, 75° to the line a—a. Hence, in setting the crank 14, for the production of a slot so arranged, the dial ring will be released, and rotated from said preferred normal position, to carry the zero mark fifteen degrees beyond the fixed index z, i. e., until the 15° indication mark in the succeeding scale quarter is brought into registration with said index z, and the dial is then temporarily fixed. The hand wheel 17, is then operated to move crank 14, until its index 28, registers with the dial zero mark, in its new position. Stop dogs 26, are preferably then clamped in positions at opposite sides of the crank, to limit the movement of the crank to thirty degrees in one direction from said zero mark and thirty degrees in the opposite direction from said zero mark. The crank pin 15, can then be set at the required radius and the work can then be fixed to table 1, at the required position with respect to the cutter 4, and with respect to the position of the crank over the dial.

The center bisecting line of the proposed slot c', of Fig. 6, is perpendicular to the longitudinal axis of the table 1, and hence in setting the table propelling and controlling organization to produce such slot in the work, the crank is moved to bring its index into registration with the appropriate zero mark of the dial, the dial being temporarily fixed in its said normal position with its zero indications in registration with the diametrical line z—z, perpendicular to the longitudinal axis of the table 1. Thereupon the parts are set and manipulated as hereinbefore described.

In Fig. 8, a piece of work w, is disclosed through one side of which a semi-cylindrical recess is to be cut to provide an arcuate vertical wall c", of, say, one inch radius, through 180°. It is assumed that the center line bisecting this 180° wall is perpendicular to the longitudinal axis of the table 1. The table propelling and controlling organization, will be set to make such cut, as by moving the crank to a position with its index 28, registering with the appropriate zero mark on the dial that is closest to the table 1, it being assumed that the dial is in its normal fixed position with its two zero marks in registration with the two fixed index marks z.

Under certain conditions, the crank pin 15, is then adjusted and set at the one inch radius indicated on the crank scale s, by the crank pin index i. Under such conditions, the work piece w, will be then fixed on table 1, behind the cutter 4, and in proper relation thereto to be moved into the cutter by the table under the propulsion of the crank pin, etc., as it swings, say, through 180° from one dial 90° mark to the other 90° mark, to cut the face c". Thereafter, the table will be fed rearwardly step by step, by the ordinary transverse work table feed mechanism, after each successive cut is made by propulsion of the table, carrying the work against and past the cutter. This will be continued, until all remaining material enclosed by the original cut, has been removed. Where such side recesses or other open end arcuate cuts are to be made it is not necessary to employ the stop dogs 26, as these stop dogs are peculiarly advantageous where closed end arcuate cuts are to be made or arcuate cuts of defined predetermined length, and where it is desirable to temporarily lock the crank in a certain angular position.

Instead of following the foregoing method of cutting the semi-cylindrical side recess c", procedure as follows, can be followed:

The crank is set at the zero mark on the dial, that is remote from the table 1, and the crank pin is adjusted and set substantially in axial alinement with its shaft 13, with the crank pin index i, registering with the zero mark of crank scale s. The work piece w, is fixed on the work table 1, in front of the cutter 4, and in the required operative association therewith to initiate the operation of cutting the required recess through what is then the rear side of the work, that will eventually provide the semi-circular recess with the wall c", of 180° and one inch radius. Thereupon, as the crank swings back and forth through 180°, the crank pin can be fed forward by its thumb wheel 22a, a predetermined distance after each cutting stroke until it reaches the predetermined radius of one inch.

If means are employed to normally lock the crank pin, before each adjustment of the crank pin 15, longitudinally of the crank 14, the crank pin is released and rendered free for adjustment, by backing up nut 15a, to release the pressure through bushing 15b, of plate 21, on the top face of the crank, and to thereby loosen the pin base 15c, in slot 14b. When the crank pin has been adjusted it is clamped in its adjusted position by rotating the nut 15a, to force the bushing 15b, downwardly to again clamp the crank pin in position. However, I do not wish to limit my invention to such details.

While I make claim thereto from a specific standpoint, and advantages and a new result are attained by the rotary dial ring having an unbroken angle or degree scale or scales in operative association with the rotary crank and its index, whether or not my advantageous arrangement of said scale in quarters with fixed cooperating index marks bearing a certain relationship to an axis of the table 1, are employed, yet I do not wish to so limit the broader and other features of my invention to such subcombinations.

The table 1, is normally held against lateral movements by the crank pin 15, i. e. when the pin 15, is stationary, the table 1, is fixed against lateral movement. The table 1, in this example, duplicates the lateral movements of the crank pin 15, and is so coupled to said crank pin that it necessarily travels with the crank pin on exactly the same path of lateral movement as does the crank pin, and cannot normally depart therefrom.

The disclosure hereof is made for purposes of explanation, and not for purposes of limitation of the appended claims except where such limitation is required by the prior art.

What I claim is:

1. A machine tool having a vertical cutter spindle normally fixedly located against lateral movements; and a horizontal work table adapted to carry the work laterally into operative lateral cutting association with the cutter of said spindle, said table being mounted for free universal lateral bodily movements substantially as specified, and held to travel in lateral arcuate and straight-line paths and against lateral pivotal swinging and tilting movements in combination with actuating and controlling mechanism for propelling said table and positively limiting the lateral movements thereof, to a predetermined path, said mechanism including a rotary eccentric member rotatable around a vertical axis laterally remote from said cutter spindle and normally fixedly located with respect to said table, means for rotating said member to propel said table bodily laterally in any direction, and an operative table controlling and laterally propelling connection from and actuated by said member and embodying a positive push and pull vertical pivotal coupling with a rigid part of said table.

2. A machine tool having a vertical cutter spindle normally fixedly located against lateral movements; and a work table adapted to carry the work laterally into operative lateral cutting association with the cutter of said spindle, said table being mounted for free universal lateral bodily movements in a horizontal plane, said table provided with a mounting holding said table against lateral pivotal swinging and tilting movements while traveling on its lateral arcuate, circular and straight-line paths, in combination with actuating and controlling mechanism for propelling said table and positively limiting the lateral movements thereof, to a predetermined path, said mechanism including a crank rotatable on a normally fixedly located vertical axis laterally remote from said cutter spindle and the work carrying area of said table, said crank having a crank pin eccentric with respect to said axis and mounted in a normally rigid part of said table for relative rotary movement on a vertical axis, means for rotating said crank to propel said table bodily laterally on a predetermined arcuate path, the same in radius and length as the paths traveled by said crank pin, and means for propelling said crank pin longitudinally of said crank while said crank is held against lateral swing to propel said table on a predetermined lateral straight line path.

3. A machine tool having a vertical cutter spindle normally fixedly located against lateral movements; and a work table adapted to carry the work laterally into operative lateral cutting association with the cutter of said spindle, said table being mounted for free universal lateral bodily movements in a horizontal plane, in combination with actuating and controlling mechanism for propelling said table and positively limiting the lateral movements thereof, to a predetermined path, said mechanism including a support remote from and normally fixed with respect to said table, a shaft normally fixedly located by said support and rotatable therein on a vertical axis laterally remote from said cutter spindle, and provided with actuating means, positive table controlling and laterally propelling means from said shaft to said table and actuated by said shaft, said means including a member eccentric with respect to said shaft and settable to predetermine the radius of arcuate lateral movements of said table propelled by said means, the aforesaid table being provided with a mounting holding said table against lateral swinging or tilting movements while being propelled on lateral circular, arcuate, or straight-line movements by said member.

4. In a machine having a vertical rotary cutter spindle, and a work table associated with said spindle to carry the work laterally into operative association with the cutter of said spindle for lateral operation on the work, said table being universally laterally movable in all directions; mechanism for controlling the lateral movements of said table and for propelling said table on certain definite predetermined movements, including a supporting frame normally rigidly mounted independently of said table, a shaft mounted in said frame for rotation on a vertical axis and provided with means for rotating the shaft in either direction substantially through 360°, said shaft provided with a crank, said crank provided with a vertical crank pin, said crank pin being provided with means for setting the same at a predetermined radius with respect to said vertical axis, a normally-stationary dial ring rotatably mounted on said supporting frame concentric with said shaft for adjustment and setting and provided with a visual circular scale of degree graduations, said frame provided with a normally fixed index for visual association with graduations of said dial scale, said crank provided with an index finger for visual association with said dial scale, and said table provided with a part normally rigid therewith in which said crank pin is mounted for rotary movement on a vertical axis.

5. A machine comprising a vertical rotary cutter spindle, and a work table universally laterally movable in any direction with respect to said vertical spindle; in combination with mechanism for propelling said table laterally on predetermined arcuate paths of movement, said mechanism including a normally fixed support, a member mounted to said support for rotation on a vertical axis, means for rotating said member on its vertical axis, and a positive push and pull table-laterally-propelling and controlling operative coupling between said member and a part rigid with said table, embodying a pivotal connection on a vertical axis eccentric to the vertical axis of said member, said pivotal connection being propelled on a lateral arcuate path by rotary movement of said member and said table being propelled on an arcuate path of like radius and through a like number of degrees by said pivotal connection, a dial ring rotatably mounted on said support for adjusting and setting, said dial ring having visual degree indications extending through at least 180°, said support having indexes for visual association with said dial indications, said indexes being substantially located at the opposite ends of a diameter of said dial substantially perpendicular to the longitudinal axial line of said table, said coupling being provided with an index for visual association with said dial ring indications, said last named index being movable with said coupling, in an arcuate path substantially concentric with said dial ring.

6. In a machine having a work table universally laterally movable in all directions on arcuate paths of movement, and an associated vertical cutter spindle; mechanism for propelling said table on its lateral movements and predetermining the radius, angle, and number of degrees of each arcuate movement, including a support normally fixedly located with respect to said table, a laterally extending crank carried by said support and swingable on a vertical axis and having positive table-propelling and controlling pivotal connection with said table on a vertical axis the eccentricity of which with respect to said first named vertical axis predetermines the radius of table arcuate movements propelled by the swing of said crank, means for propelling said crank in either direction on its said vertical axis, a normally stationary dial ring rotatably mounted on said support substantially concentric with the vertical axis of said crank and provided with a circular visual degree scale divided into quarters running in opposite directions from zero to 90°, relatively fixed indexes for said ring scale, and an index carried by said swingable crank in operative visual association with the degree indications of said dial ring.

7. In a machine having a work table universally laterally movable in all directions on arcuate paths of movement, and an associated vertical cutter spindle; mechanism for propelling said table on its lateral movements and predetermining the radius, angle, and number of degrees of each arcuate movement, including a support normally fixedly located with respect to said table, a laterally extending crank carried by said support and swingable on a vertical axis and having positive table-propelling and controlling pivotal connection with said table on a vertical axis the eccentricity of which with respect to said first named vertical axis predetermines the radius of table arcuate movements propelled by the swing of said crank, said connection holding said table while being propelled thereby to the same arcuate paths of movement as those traveled by said vertical axis of said connection, means for propelling said crank in either direction on its said vertical axis, and removable stop dogs normally carried by said support and settable at various angular positions, for cooperative association with said crank to define or limit the arcuate movements thereof.

8. In a machine tool having a horizontally-disposed work table member for fixedly holding the work, and a vertical rotary cutter spindle member adapted to produce arcuate cuts in said work by arcuate lateral relative movements between said members; controlling and propelling mechanism operatively associated with at least one of said members for actuating the same on said relative lateral arcuate movements and for predetermining the radius and angular length thereof, including a normally fixed support, a lateral movement defining and propelling crank carried by said support and swingable on a vertical axis and provided with settable means for predetermining the radius of such arcuate movement, means for propelling said crank on said axis through 360° or a fraction thereof, a normally-set dial ring mounted for rotatable adjustment and setting on said support concentric with said vertical axis, and provided with a visual circular scale of degree indications, a normally fixed index carried by said crank in visual association with said dial scale, said support having an index in visual association with said dial scale.

9. In a machine tool having a horizontally-disposed work table member for fixedly holding the work, and a vertical rotary cutter spindle member adapted to produce arcuate and straight line cuts in said work by straight line and arcuate lateral relative movements between said members; controlling and propelling mechanism operatively associated with at least one of said members for actuating the same on said relative lateral straight line and arcuate movements and for predetermining the angle and length or radius and angular length thereof, including a normally fixed support, a lateral movement defining and propelling crank carried by said support and swingable on a vertical axis and provided with settable means for predetermining the radius of such arcuate movement, means for propelling said crank on said axis through 360° or a fraction thereof, a normally-set dial ring mounted for rotation on said support concentric with said vertical axis, and provided with a visual circular degree indication scale providing two diametrically opposite zero indications and two 90° indications on a diametrical line perpendicular to the diametrical line that includes said zero indications with each 180° indications running progressively in opposite directions from zero to 90°, said support provided with two diametrically opposite fixed index marks for visual association with diametrically opposite degree indications of said dial scale, and an index carried by said crank in visual association with said dial scale.

10. A machine tool comprising a vertical cutter spindle, a horizontally-disposed table-member feedable longitudinally and transversely, a horizontally disposed work table under said cutter spindle, and a mounting for said work table rendering the same freely universally bodily movable laterally in all directions on arcuate and straight-line paths while holding said table against lateral pivotal tilting and swinging movements, said mounting including a base normally fixed to said table member, and a saddle confined to said base for free relative movements in a straight line, said work table being carried by said saddle and confined thereto for free relative movements in a straight line perpendicular to said straight line movement of said saddle; in combination with a work table propelling and controlling mechanism comprising a support normally fixed to said base, a table-propelling member carried by said support and rotatable on a vertical axis and provided with means for rotating the same, and a table laterally-propelling and controlling operative eccentric transmission between said member and a portion rigid with said work table including a push and pull pivotal coupling on a vertical axis, whereby all work-receiving portions of said table duplicate the lateral arcuate and straight-line movements of said vertical axis under the propulsion of said table-propelling member.

11. In a machine tool that comprises a vertical cutter spindle, a horizontally disposed work table having an area under said spindle for fixedly receiving the work, and a mounting for said table holding the same for universal lateral bodily movements in all directions on circular, arcuate and straight-line paths, while constantly maintaining the table throughout said movements with its longitudinal axial line constantly parallel with a vertical plane including said spindle and arranged longitudinally of said table; table-controlling and laterally-propelling mechanism removably coupled to said work table and to a normally stationary machine part, said mechanism including a transmission for propelling the table laterally in predetermined arcuate, circular and straight-line paths, adjusting and setting means for predetermining the radius of the table arcuate and circular lateral movements, and means for actuating said transmission.

12. A machine tool comprising a horizontal work table having a top work-receiving area, a vertical cutter spindle arranged over said area, and a mounting for said table rendering the same freely movable bodily in all lateral directions on arcuate, circular and straight-line paths of movement while constantly maintaining said table against lateral tilting or inclination; in combination with a supporting frame, means removably fixing said frame to a normally-stationary part of said machine tool, a shaft carried by said frame and rotating on a vertical axis remote from said table, actuating means carried by said frame for rotating said shaft, a lateral crank arm carried and actuated by said shaft, and a detachable positive push and pull transmission between said crank and said table, said transmission including a projecting part normally rigid with said table, and a member carried by said crank arm and pivotally joined to said part on a vertical axis predetermining the radius of arcuate and circular lateral movements of said table, and means for varying the radius of said vertical axis with respect to said shaft.

13. A machine tool including a horizontally disposed work table having a top work receiving area, said table mounted for free universal bodily movements in all lateral directions, and a cutter spindle operatively arranged above said table work receiving area; in combination with a supporting housing normally fixedly supported apart from said table, a vertical rotary shaft carried by said housing, actuating means carried by said housing for rotating said shaft, a lateral crank arm rigid with said shaft and arranged over said housing, an eccentric member carried by said arm, a vertical-axis pivotal push and pull coupling between said member and a part rigid with said table, accessible manually-actuated means for forcibly propelling said member longitudinally of said crank for propelling said table on straight-line lateral paths of movement, and for setting said member at a predetermined radius; and shiftable settable stop dogs on said housing to lock said crank arm against swing during said table straight-line movements, and for defining the swing of said crank arm for table arcuate movements.

14. A work table propelling and controlling accessory for a machine tool of the milling, diesinking, duplicator, or substantially like type, having a horizontally disposed work table with a top work receiving area, provided with a mounting rendering said table universally bodily movable laterally in all straight-line and arcuate paths of movement while said table is held against lateral pivotal swing or inclination, and a vertical cutter spindle arranged over said table work receiving area; said accessory comprising a housing laterally remote from said spindle, and means for removably fixing said housing exteriorly of said table to a normally stationary part of said machine tool, a vertical shaft carried by and rotatably mounted to said housing, exteriorly accessible driving means for said shaft carried by said housing, a lateral crank rigid with said shaft and exposed exteriorly of a housing end, an eccentric member carried by said crank, exteriorly accessible manually actuated means for propelling said member longitudinally of said crank for predetermining the radius of arcuate table movements and for propelling said table on straight line movements, a push and pull arm pivotally coupled to said member on a table-propelling push and pull vertical axis, and means for removably fixing said arm to and projecting from said table.

15. A work table propelling and controlling accessory for a machine tool having a horizontally disposed work table mounted for universal lateral bodily movements, and a vertical cutter spindle cooperatively arranged over the work receiving areas of said table; said accessory comprising a supporting housing, means for removably fixing said housing exteriorly of said machine tool to a normally stationary part thereof, a vertical shaft carried by said housing and mounted for rotation, exteriorly accessible shaft-driving means carried by said housing, a lateral crank arm driven by said shaft and arranged exteriorly of an end of said housing, said housing end provided with a visible circular scale of degree indications, said crank provided with an index traveling therewith and visually associated with said scale and movable in a circle substantially concentric with said circular scale, an eccentric member carried by said crank arm, means for propelling said member longitudinally of said crank arm for setting at a predetermined radius and for propelling said table on said straight-line lateral movements, means for temporarily locking said crank arm at any desired angular position against lateral swing for said straight-line table propulsion, a lateral arm pivotally coupled to said member on a push and pull vertical axis; and means for removably securing said arm as a normally-rigid projecting part of said table.

16. A work table propelling and controlling accessory for a machine tool of the type having a work table mounted for free universal lateral movements on arcuate and straight-line paths, and a vertical cutter spindle arranged over said table; said accessory including a vertical rotary shaft, means for driving said shaft, and a lateral eccentric work table-propelling transmission actuated by said shaft comprising means for detachably coupling said transmission to a part normally fixed to said table and a vertical pivotal table push and pull axis eccentric with respect to said shaft and predetermining the radius of table arcuate movements, a housing carrying said shaft, drive means and transmission, said housing provided with an exterior support, and means for removably securing said support to a normally stationary part of said machine tool to hold said housing in an accessible position beyond said work table, with said rotary shaft laterally remote from said spindle.

17. A work table propelling and controlling accessory for a machine tool having a horizontally-disposed work table universally bodily movable laterally on arcuate, circular, and straight-line paths, and a vertical cutter spindle over the work receiving area of said table and normally held against lateral movements; said accessory comprising a housing having a substantially circular end wall, means for detachably holding said housing in a stationary position beyond said work table, a vertical rotary shaft mounted to and carried by said housing and provided with a lateral crank exposed over said end wall, means carried by said housing for driving said shaft and its crank in either direction through a full circle or any fraction thereof, said end wall formed for the reception of one or more stop dogs at any angular position throughout the circle thereof, one or more crank-stop dogs on said wall in the path of movement of said crank, and means for establishing a detachable operative table push and pull pivotal coupling on an eccentric vertical axis between said crank and said work table.

18. A work table propelling and controlling accessory for removable application to a machine tool having a work table universally bodily movable laterally in all directions, and a vertical cutter spindle operatively arranged over the work receiving portion of said table; said accessory comprising a housing having a support normally rigid therewith, for removably securing said housing to a normally stationary part of said machine tool, table propelling and controlling means and exteriorly-accessible driving devices therefor carried by said housing, means for detachably and operatively coupling said propelling and controlling means to said table, said last named means including an eccentric positive push and pull pivotal vertical axis having a circular path of movement exteriorly of an end of said housing, around a vertical axis and settable with respect thereto to predetermine the radius of work table arcuate movement, and a normally stationary dial ring having a circular scale of degree indications rotatably mounted and settable on said housing end substantially concentric with said vertical axis and having visible degree indications therearound, and in visual association with said eccentric pivotal vertical axis.

GEORGE GORTON, III.